(12) United States Patent
Luo et al.

(10) Patent No.: US 7,353,696 B2
(45) Date of Patent: Apr. 8, 2008

(54) APPARATUS FOR MEASURING METHANOL CONCENTRATION

(75) Inventors: Xiaobing Luo, Yongin-si (KR); Hye-jung Cho, Anyang-si (KR); Jae-yong Lee, Seongnam-si (KR); Sang-kyun Kang, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 11 days.

(21) Appl. No.: 11/289,542

(22) Filed: Nov. 30, 2005

(65) Prior Publication Data

US 2006/0123891 A1 Jun. 15, 2006

(30) Foreign Application Priority Data

Dec. 9, 2004 (KR) ............. 10-2004-0103676

(51) Int. Cl.
*G01N 11/10* (2006.01)
*H01M 8/04* (2006.01)
*H01M 8/10* (2006.01)

(52) U.S. Cl. ............ 73/61.61; 73/54.01; 73/54.02; 73/54.23; 73/54.38; 429/90

(58) Field of Classification Search ......... 73/53.01, 73/54.01, 54.23, 54.38, 61.47, 61.61, 54.02, 73/61.43, 861.71; 429/90
See application file for complete search history.

(56) References Cited

U.S. PATENT DOCUMENTS

| 4,312,235 | A  | * | 1/1982  | Daigle ............... 73/861.18 |
| 6,303,244 | B1 |   | 10/2001 | Surampudi et al. |
| 6,488,837 | B1 |   | 12/2002 | Ren et al. |
| 6,536,262 | B2 | * | 3/2003  | Baldauf et al. ........ 73/61.47 |
| 2004/0013912 | A1 |   | 1/2004 | Preidel |

* cited by examiner

*Primary Examiner*—Daniel S. Larkin
(74) *Attorney, Agent, or Firm*—H.C. Park & Associates, PLC

(57) ABSTRACT

An apparatus for measuring a methanol concentration is provided. The apparatus is located in a pipe which supplies liquid fuel to the anode of a direct liquid feed fuel cell, and may include a vertical supporting beam located in the pipe; a horizontal plate located on the supporting beam and having an upper surface with a predetermined roughness; and a sensor fixed to a side of the supporting beam, which generates an electrical signal through a transformation of the supporting beam resulting from variations in a viscosity of the liquid fuel running through the pipe.

9 Claims, 4 Drawing Sheets

APPARATUS FOR MEASURING METHANOL CONCENTRATION

BACKGROUND OF THE INVENTION

This application claims priority to and the benefit of Korean Patent Application No. 10-2004-0103676, filed on Dec. 9, 2004, in the Korean Intellectual Property Office, the disclosure of which is incorporated herein in its entirety by reference.

FIELD OF THE INVENTION

The present invention relates to a sensor for measuring alcohol concentration, and more particularly, to a sensor for measuring the concentration of dilute alcohol which is supplied to the anode of a direct liquid feed fuel cell.

DESCRIPTION OF THE RELATED ART

A direct liquid feed fuel cell generates electrical power by the electrochemical reactions between a fuel such as methanol or ethanol and an oxidizing agent such as oxygen, and has a high energy and power density. Since the direct liquid feed fuel cell consumes fuel directly, external peripheral devices such as a fuel reformer are not required, and the fuel is easily stored and supplied.

An exemplary direct liquid feed fuel cell has an electrolyte membrane 1 interposed between an anode 2 and a cathode 3, as illustrated in FIG. 1. The anode 2 and the cathode 3 respectively include fuel diffusion layers 22 and 32 for the supply and diffusion of fuel, catalyst layers 21 and 31 for the oxidation-reduction reaction of fuel, and electrode supporting layers 23 and 33. A catalyst for electrode reactions may be composed of a noble metal having good catalytic characteristics even at low temperatures, such as Pt. To prevent catalyst poisoning by reaction byproducts, e.g., carbon monoxide, alloys containing transition metal such as Ru, Rh, Os, or Ni can also be used. The electrode supporting layers 23 and 33 are made of carbon paper or carbon cloth, and their surfaces are water-proofed for easy supply of fuel and discharge of reaction products. The electrolyte membrane 1 may be a polymer membrane with a thickness of 50-200 μm. A hydrogen ion exchange membrane containing moisture and having ionic conductivity is usually used as the electrolyte membrane 1.

Two electrochemical reactions occur in a direct methanol fuel cell (DMFC), which uses a mixture of methanol and water as fuel. At an anode reaction, fuel is oxidized, and at a cathode reaction, oxygen and hydrogen ions are reduced. The reactions are as follows:

Anode Reaction: 
Cathode Reaction: 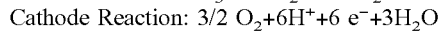
Overall Reaction: 

A methanol molecule reacts with a water molecule at the anode 2 to produce a carbon dioxide molecule, six hydrogen ions, and six electrons. The hydrogen ions migrate to the cathode 3 through the electrolyte membrane 1 and react with oxygen and electrons, which are supplied via an external circuit, at the cathode 3 to produce water. That is, in the overall reaction in the DMFC, water and carbon dioxide are produced through the reaction of methanol with oxygen. Here, a molecule of methanol reacts with oxygen to produce 2 molecules of water.

The fuel is not pure methanol but a mixture of methanol and water which is produced or stored in the system. When the concentration of methanol in the mixture is high, the electrical power generation performance is considerably decreased due to cross-over (a phenomenon in which fuel passes through the membrane) of the fuel in the electrolyte membrane (hydrogen ion exchange membrane). Thus, dilute methanol with a concentration of 0.5 to 2 M (2 to 8 vol. %) is generally used.

A DMFC system has a fuel tank storing concentrated or pure methanol, and supplies a mixture of methanol from the fuel tank and water recovered from the DMFC or supplied from a water tank as fuel to the anode. Here, a methanol sensor is needed to measure the concentration of the mixture.

U.S. Pat. No. 6,303,244 discloses a methanol sensor for sensing the methanol concentration in a circulating tank, but there is no description of a specific measuring method. U.S. Pat. No. 6,488,837 teaches that methanol concentration can be measured using a current sensor, which outputs an electrical signal in proportion to the methanol concentration. U.S. Patent Publication No. 2004/0013912 teaches that a small amount of the methanol solution of a fuel cell is separated and heated until boiling, and the boiling point is measured to determine the methanol concentration. U.S. Pat. No. 6,536,262 discloses a method of determining alcohol concentration using a pressure difference between two points at a bypass line installed at a fuel supply line.

SUMMARY OF THE INVENTION

The present invention provides an apparatus for reliably measuring methanol concentration using the viscosity of methanol.

According to an aspect of the present invention, there is provided an apparatus for measuring a methanol concentration, located in a pipe which supplies liquid fuel to the anode of a direct liquid feed fuel cell. The apparatus may include a vertical supporting beam located in the pipe; a horizontal plate located on the supporting beam and having an upper surface with a predetermined roughness; and a sensor fixed to a side of the supporting beam, which generates an electrical signal through a transformation of the supporting beam resulting from variations in a viscosity of the liquid fuel running through the pipe.

According to another aspect of the present invention, there is provided an apparatus for measuring a methanol concentration, located at a pipe which supplies liquid fuel to the anode of a direct liquid feed fuel cell and has a first opening. The apparatus may include a housing having a second opening corresponding to the first opening in its top, and fixed to an outside of the pipe by aligning the second opening with the first opening; a supporting beam having one end fixed to a bottom of the housing penetrating through the second opening, separated from the first opening and the second opening; a plate fixed to the other end of the supporting beam and having an upper surface with a predetermined roughness; and a sensor fixed to a side of the supporting beam, which generates an electrical signal through the transformation of the supporting beam resulting from variations in a viscosity of the liquid fuel running through the pipe.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

The present invention will now be described more fully with reference to the accompanying drawings, in which exemplary embodiments of the invention are shown.

Figure 1:
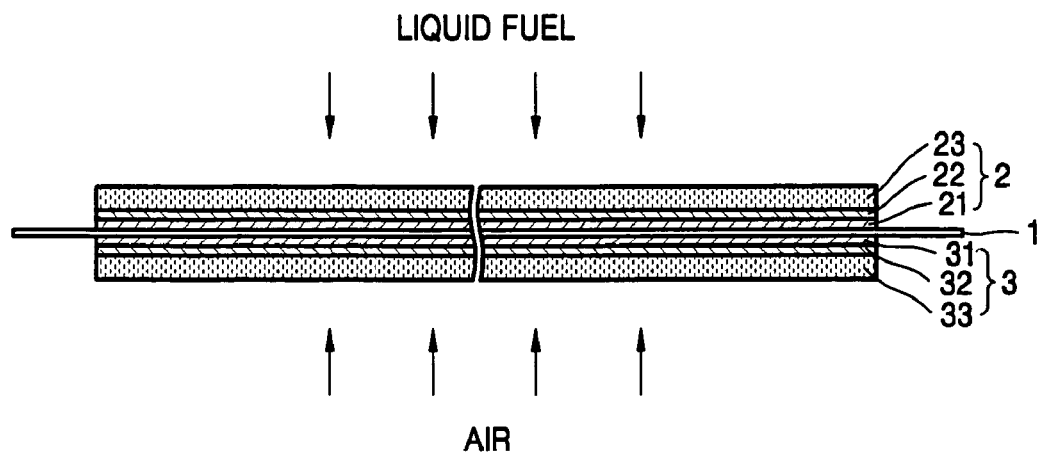
FIG. 1 is a cross-sectional view of a general structure of a direct liquid feed fuel cell.
Figure 2:
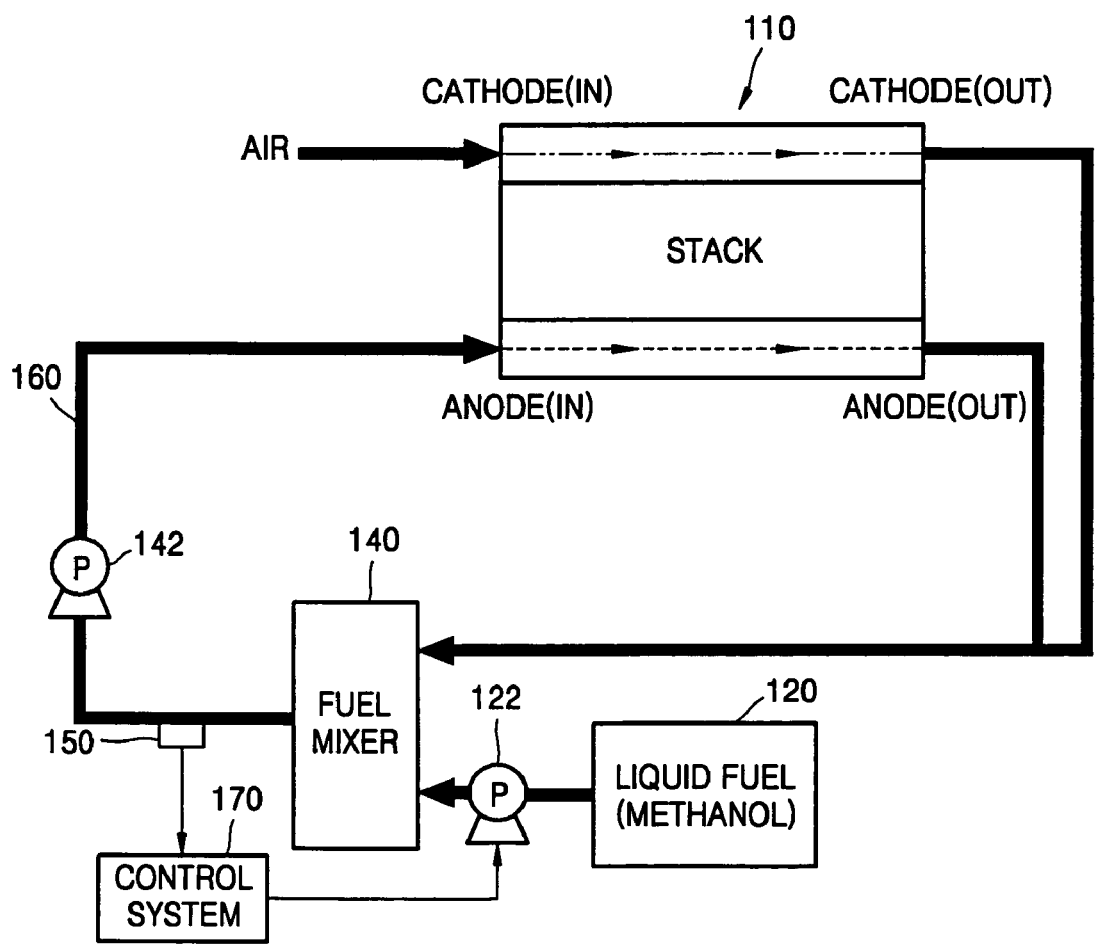
FIG. 2 is a schematic configuration of a direct liquid feed fuel cell system having an apparatus for measuring methanol concentration according to an embodiment of the present invention.

FIG. 2 is a schematic configuration of a direct liquid feed fuel cell system having an apparatus for measuring methanol concentration according to an embodiment of the present invention.

Referring to FIG. 2, air for a reduction reaction is supplied to a cathode in a stack 110, and water produced by the reaction at the cathode is recovered to a fuel mixer 140. Highly concentrated or pure methanol is stored in a fuel tank 120.

The concentrated methanol fuel in the fuel tank 120 is supplied to a fuel mixer 140 by a first pump 122. The methanol supplied to the fuel mixer 140 is mixed with unreacted fuel returned from the anode to the fuel mixer 140 and water from the cathode. Then, the mixed liquid fuel is supplied to the anode of the stack 110 by a second pump 142.

The concentration of the dilute fuel supplied from the fuel mixer 140 to the anode is measured by an apparatus 150 for measuring methanol concentration, fitted in a pipe 160 between the fuel mixer 140 and the anode. A control system 170 controls the amount of fuel supplied to the fuel mixer 140 using a first pump 122, according to the methanol concentration measured.

Figure 3:
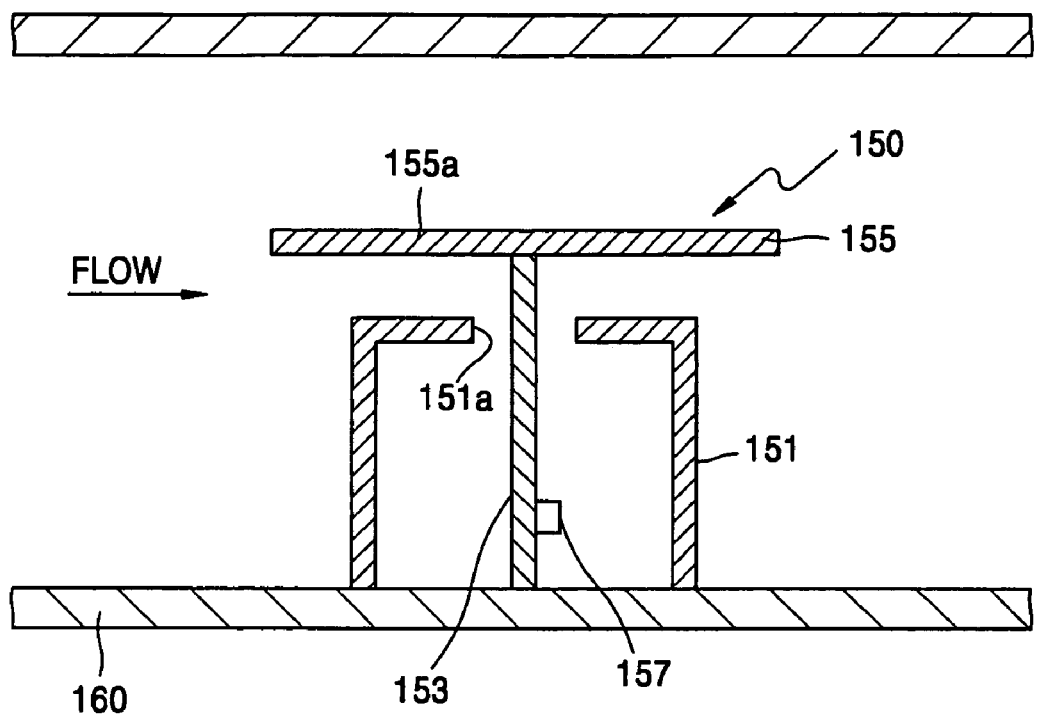
FIG. 3 is a cross-sectional view of an apparatus for measuring methanol concentration according to an embodiment of the present invention.

FIG. 3 is a cross-sectional view of the apparatus for measuring methanol concentration according to an embodiment of the present invention.

Referring to FIG. 3, the apparatus 150 for measuring methanol concentration is located in the pipe 160, through which liquid fuel flows at a constant velocity. The flow velocity of the liquid fuel can be controlled by the second pump 142 illustrated in FIG. 2. The apparatus 150 for measuring methanol concentration includes a housing 151 fixed to the pipe 160 and having an opening 151a in its top; a vertical supporting beam 153 protruding from the housing 151 through the opening 151a; a plate 155 fixed by its lower surface to the supporting beam 153; and a piezoresistive sensor 157 attached to one side of the supporting beam 153. The piezoresistive sensor 157 outputs an electrical signal to the control system 170 through an electrical circuit (not shown).

The housing 151 prevents the supporting beam 153 from being pressurized by fuel flow directly. The upper portion of the housing 151 prevents fuel flow from generating a vortex in the housing 151.

One end of the supporting beam 153 is fixed to the pipe 160, and the other end is fixed to the lower surface of the plate 155. Although in FIG. 3 the end of the supporting beam 153 is fixed directly to the pipe 160, it may instead be fixed to the bottom (not shown) of the housing 151, and the bottom of the housing 151 fixed to the pipe 160.

The upper surface 155a of the plate 155 has a roughness of preferably 1/100 to 1/10 RMS (root mean square) of the thickness of the plate 155. The upper surface 155a is affected by a viscous force due to fuel flow. The supporting beam 153 is transformed in proportion to the viscous force in the direction of fuel flow. The degree of transformation of the supporting beam 153 is represented by the electrical signal of the piezoresistive sensor 157. As the viscous force increases, the degree of transformation increases, and thus the output of the piezoresistive sensor 157 increases. In the present invention, the electrical signal is used to measure the methanol concentration.

The relationship between the viscous force $F_{viscosity}$ and the viscosity of the methanol solution according to the present invention is given by Equation 1

$$F_{viscosity} = A\eta \frac{dv}{dy} \quad (1)$$

where A is the area of the upper surface 155a of the plate 155, η is a viscosity of the fluid, and dv/dy is the velocity gradient in a direction perpendicular to the direction of fluid flow. When the flow velocity is maintained constant by the second pump 142, dv/dy becomes constant, and thus the viscous force $F_{viscosity}$ is proportional to the viscosity of the fluid.

Figure 4:
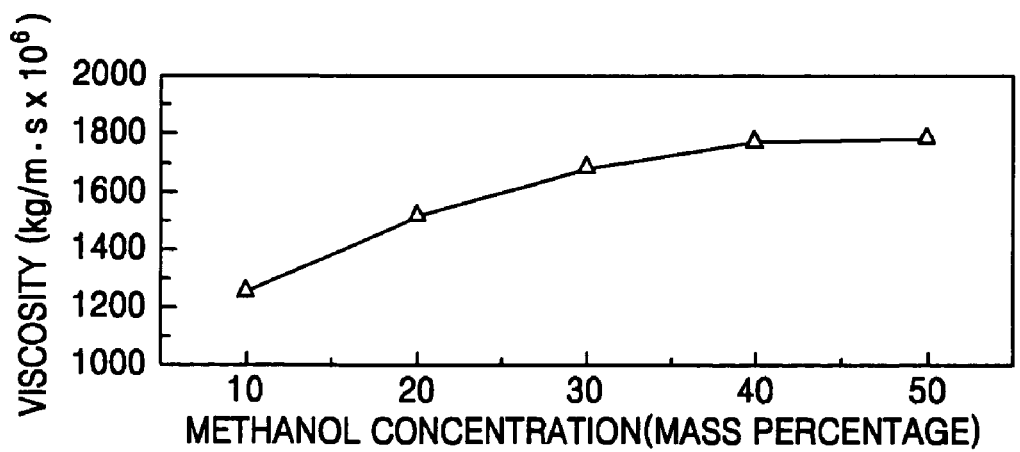
FIG. 4 is a graph illustrating the relationship between the viscosity and the concentration of methanol.

FIG. 4 is a graph illustrating the relationship between the viscosity and the concentration of methanol. When the methanol concentration increases at 40° C., the viscosity of the fluid increases at a constant rate. Thus, the methanol concentration can be determined by measuring the viscosity of the fluid running in the pipe 160.

Figure 5:
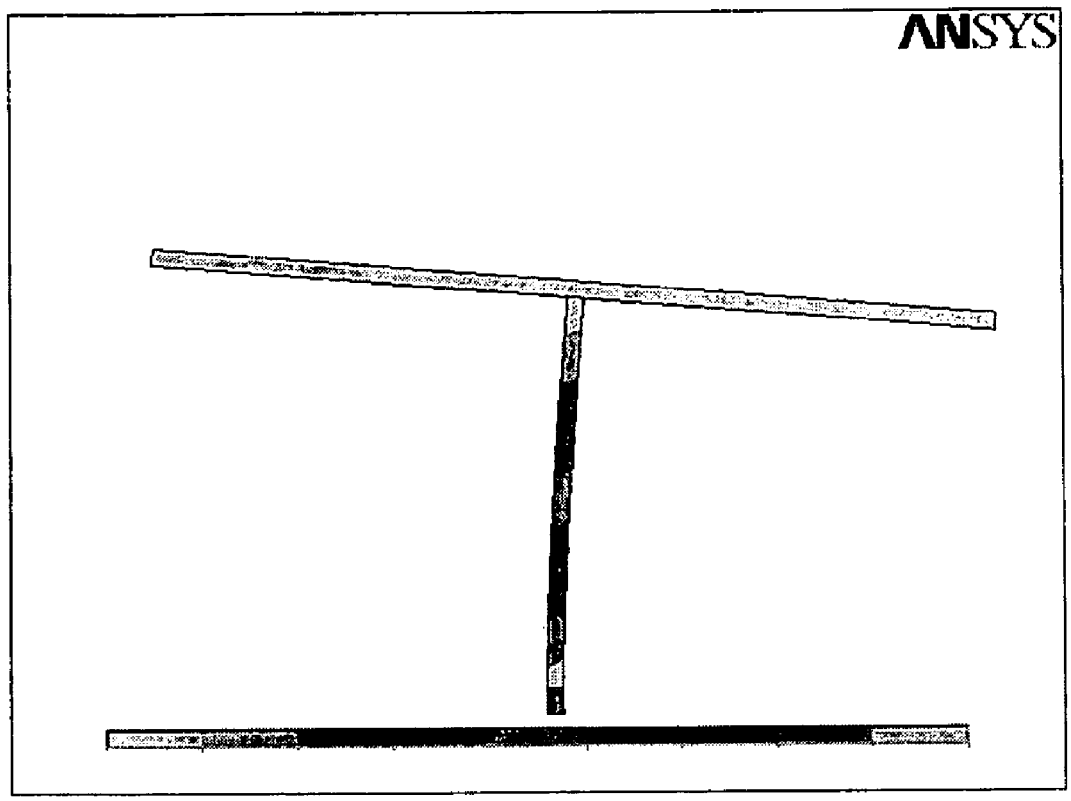
FIG. 5 illustrates the results of simulating the degree of transformation of a supporting beam in a 1.0 M methanol solution.

FIG. 5 illustrates the results of simulating the degree of transformation of the supporting beam in a 1.0 M methanol solution. Here, the Reynolds number was 178.1 and shear stress was calculated at various positions of the supporting beam. The Reynolds number for a flow through a pipe is defined as:

$$Re \equiv \frac{\rho \overline{u} d}{h} = \frac{\overline{u} d}{v}, \quad (1)$$

where ρ is the density of the fluid, $\overline{u}$ is the velocity scale, d is the pipe diameter, and v is the kinematic viscosity of the fluid.

Figure 6:
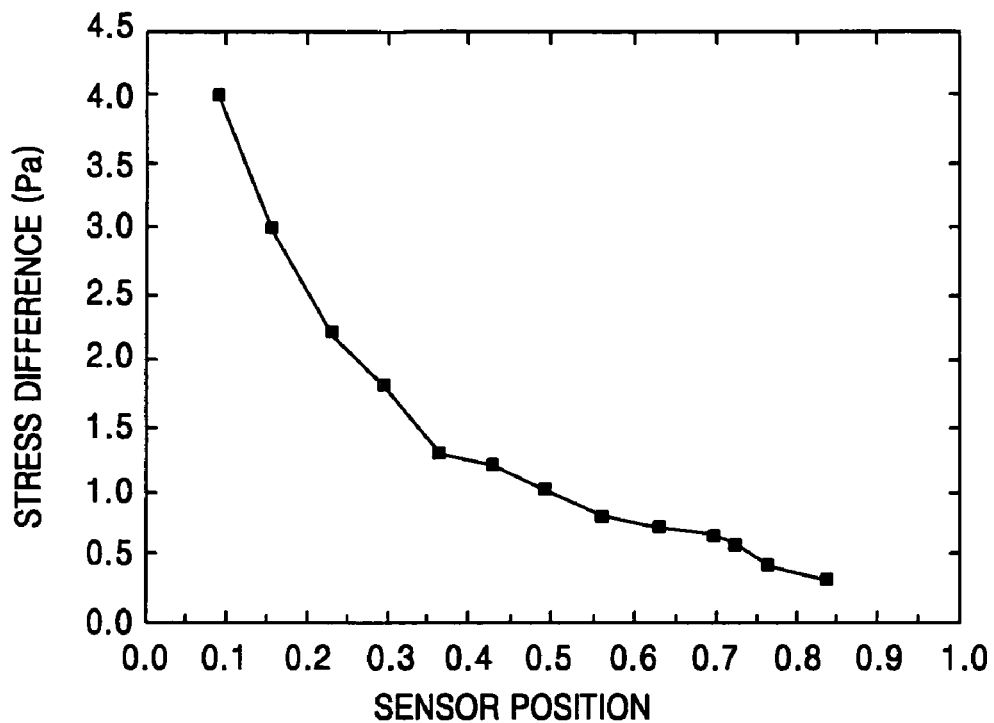
FIG. 6 is a graph illustrating the difference between the stress measured in the same manner as in FIG. 5 in a 1.1 M methanol solution and the stress measured in a 1.0 M methanol solution.

FIG. 6 is a graph illustrating the difference between the stress measured in the same manner as in FIG. 5 in a 1.1 M methanol solution and the stress measured in a 1.0 M methanol solution. Here, the abscissa is defined as non-dimensional sensor position, the bottom position of the supporting beam 153 is defined as 0 and the top position of the supporting beam 153 is defined as 1.

Referring to FIGS. 5 and 6, there is a stress difference even for a 0.1M concentration difference, which indicates that the sensitivity of the apparatus for measuring methanol concentration according to the present invention is 0.1 M or better. The piezoresistive sensor 157 can be located at 0.1 to 0.85 along the supporting beam 153. However, the stress difference is greater at the lower portion of the supporting beam 153. Also, when the piezoresistive 157 sensor is located at the lower portion of beam, the piezoresistive sensor 157 is less affected by direct fluid-flow impingement, the resultant sensor noise will be decreased. Based on the above two points, the sensitivity of the sensor 157 is larger at the lower portion of the supporting beam 153. Thus, the piezoresistive sensor 157 is preferably located on the lower portion of the supporting beam 153.

Figure 7:
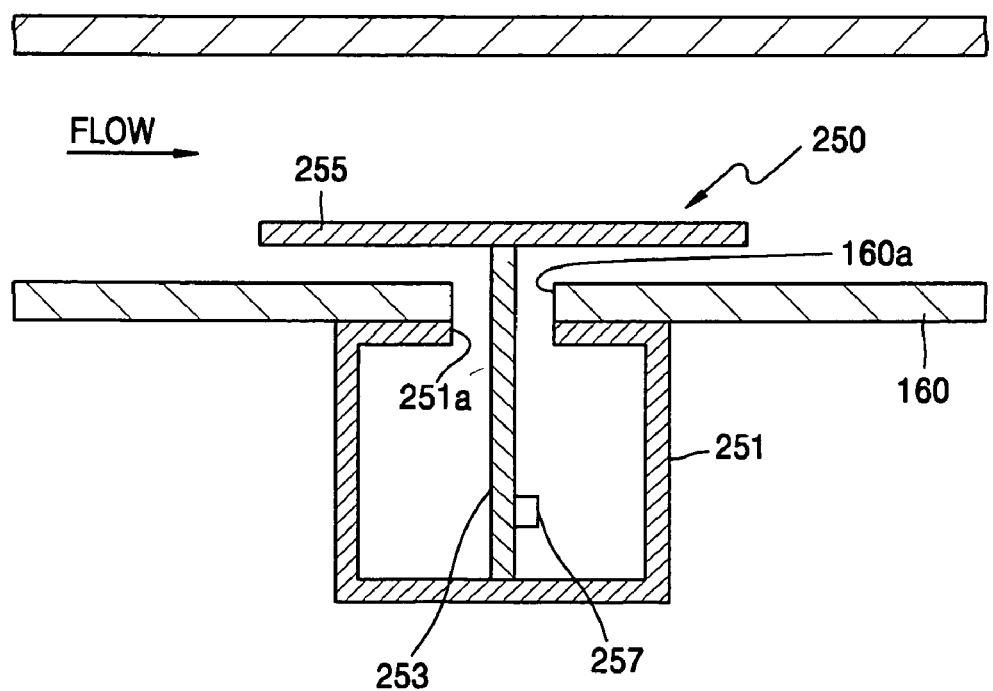
FIG. 7 is a cross-sectional view of an apparatus for measuring methanol concentration according to another embodiment of the present invention.

FIG. 7 is a cross-sectional view of an apparatus 250 for measuring methanol concentration according to another embodiment of the present invention.

Referring to FIG. 7, the apparatus for measuring methanol concentration is located in a pipe 160 through which a liquid fuel runs at a constant velocity. The flow velocity of the liquid fuel can be controlled by the second pump 142 illustrated in FIG. 2. The apparatus 250 for measuring methanol concentration includes a housing 251 fixed to the outside of the pipe 160. The pipe 160 has a first opening 160a, and the housing 251 has a second opening 251a at its top, corresponding to the first opening 160a. The apparatus 250 also includes a vertical supporting beam 253 protruding from the housing 251 through the second opening 251a and the first opening 160a, a plate 255 fixed by its lower surface to the supporting beam 253, and a piezoresistive sensor 257 attached to the side of the supporting beam 253. The piezoresistive sensor 257 outputs an electrical signal to the control system 170 through an electrical circuit (not shown).

One end of the supporting beam 253 is fixed to the bottom of the housing 251, and the other end is fixed to the lower surface of the plate 255.

The upper surface 255a of the plate 255 has a roughness of preferably $1/100$ to $1/10$ RMS (root mean square) of the thickness of the plate 255.

The operation of the apparatus 250 for measuring methanol concentration is similar to that of the apparatus 150, and thus its detailed description will not be repeated.

As described above, the apparatus for measuring methanol concentration according to the embodiments of the present invention has a good sensitivity at a methanol concentration of about 1.0 M as is used in a small apparatus, and thus can be effectively used in a small portable direct liquid feed fuel cell.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for measuring a methanol concentration, comprising:
    an apparatus located in a pipe, wherein the pipe supplies liquid fuel to an anode of a direct liquid feed fuel cell, the apparatus comprising:
        a vertical supporting beam;
        a plate located on the end of the supporting beam and having an upper surface with a predetermined roughness; and
        a sensor fixed to a side of the supporting beam; and
    a control system,
    wherein the sensor generates an electrical signal through a transformation of the supporting beam resulting from variations in viscosity of the liquid fuel running through the pipe; and
    wherein the control system calculates the methanol concentration from the generated electrical signal.

2. The system of claim 1, wherein the apparatus further comprises a housing, the housing comprising an opening in its top through which the supporting beam is fixed to the pipe.

3. The system of claim 1, wherein the sensor is a piezoresistive sensor.

4. The system of claim 3, wherein the piezoresistive sensor is located on the bottom half of the supporting beam.

5. The system of claim 1, wherein the roughness of the upper surface of the plate is $1/100$ to $1/10$ RMS of a thickness of the plate.

6. A system for measuring a methanol concentration, comprising:
    an apparatus located at a pipe, wherein the pipe comprises a first opening and supplies liquid fuel to an anode of a direct liquid feed fuel cell, the apparatus comprising:
        a housing comprising a second opening corresponding to the first opening in its top, and fixed to an outside of the pipe by aligning the second opening with the first opening;
        a supporting beam comprising one end fixed to a bottom of the housing penetrating through the second opening, separated from the first opening and the second opening;
        a plate fixed to the other end of the supporting beam and having an upper surface with a predetermined roughness; and
        a sensor fixed to a side of the supporting beam; and
    a control system,
    wherein the sensor generates an electrical signal through a transformation of the supporting beam resulting from variations in viscosity of the liquid fuel running through the pipe; and
    wherein the control system calculates the methanol concentration from the generated electrical signal.

7. The system of claim 6, wherein the sensor is a piezoresistive sensor.

8. The system of claim 7, wherein the piezoresistive sensor is located on the bottom half of the supporting beam.

9. The system of claim 6, wherein the roughness of the upper surface of the plate is $1/100$ to $1/10$ RMS of a thickness of the plate.

* * * * *